July 8, 1930.  F. W. KRONE  1,770,313

TIRE CONSTRUCTION

Filed Sept. 21, 1927

INVENTOR.
F. W KRONE
BY Victor J. Evans
ATTORNEYS.

Patented July 8, 1930

1,770,313

UNITED STATES PATENT OFFICE

FREDERICK W. KRONE, OF SAN FRANCISCO, CALIFORNIA

TIRE CONSTRUCTION

Application filed September 21, 1927. Serial No. 221,014.

This invention relates to improvements in tire constructions, and has particular reference to a novel means for counter-sinking the valve stem in the inner tube of a tire.

Another object of this invention is to provide a simple arrangement of the valve stem within the tube so that should the tire become deflated, danger of the valve stem cutting the tube as the wheel revolves and a bending or distortion of the valve stem, will be obviated.

Other objects and advantages will be apparent during the course of the following description.

Figure 1:
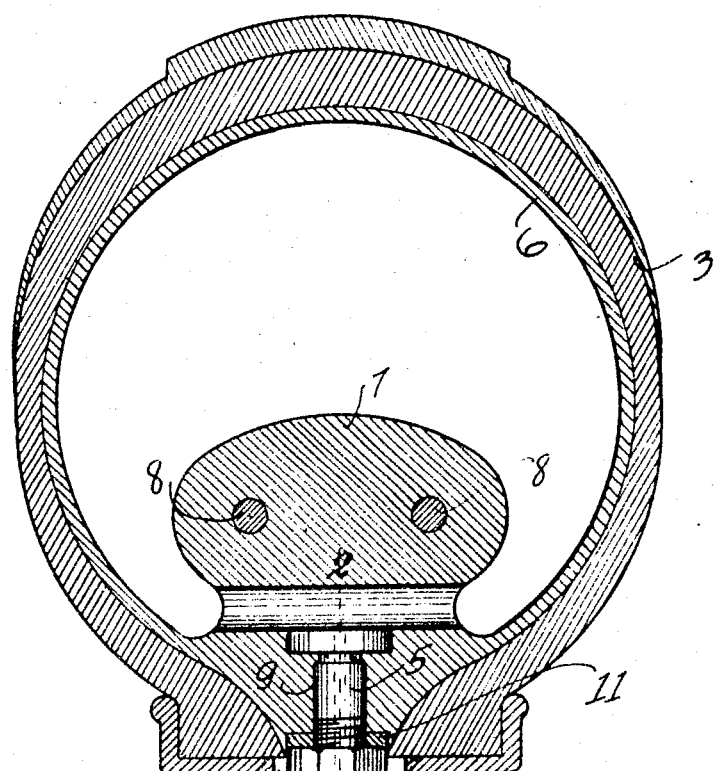
Figure 2:
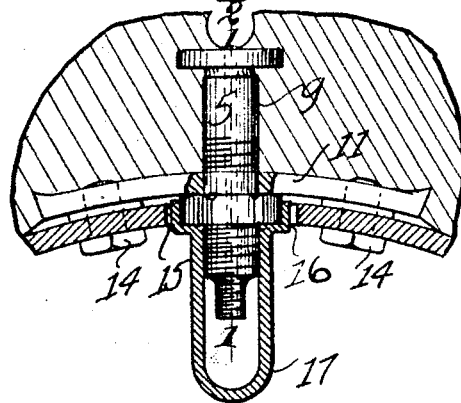
Figure 3:
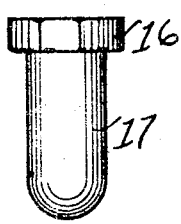

In the accompanying drawings forming a part of this specification, and in which like numerals are employed to designate like parts throughout the same, Figure 1 is a section through a tire disclosing the valve stem in elevation, Figure 2 is a sectional detail disclosing to advantage the valve cap for holding the valve nut forming a part of my invention, and Figure 3 is a side elevation of the valve stem cover.

In the accompanying drawings wherein for the purpose of illustration is shown a preferred embodiment of my invention, the numeral 3 designates the casing of a balloon tire provided with the usual rim 4 and a valve stem 5, which stem penetrates the rim and extends within the tire.

As shown to advantage in Figure 1, the numeral 6 designates the inner tube which has secured thereto a cushion element 7. This cushion element is provided with re-enforcing members 8 which extend through the same and may be either metal or fabric and serve to strengthen the tube and prevent a spreading of the cushion element.

For the purpose of preventing the valve stem from cutting the tube as the wheel revolves, I propose to counter-sink the valve 5 in the cushion element as indicated by the numeral 9 and when the valve stem is so counter-sunk to lock the same to the rim 4 as by a lock nut 10.

Surrounding the valve stem and secured within the cushion element is a plate 11 which is connected adjacent its extremities to the rim by fastening elements 14, the plate 11 cooperating with the rim through the medium of the fastening elements serves to hold the counter-sunk valve in a fixed position within the cushion element so that all danger of a bending or distortion of the valve stem will be eliminated.

It is to be noted that the lock nut 10 contacts the plate 11, while the rim 4 is apertured as at 15 so that the collar 16 of the valve stem cover 17 may be readily positioned about the lock nut for the purpose of forcing the stem into intimate contact with the plate 11, or for removing the lock nut when desired.

From the foregoing description, taken in connection with the accompanying drawing, it will be evident that I have devised a novel arrangement of the valve stem within the cushion element that will readily accomplish all the objects set forth.

It is to be understood that the form of my invention herewith shown and described is to be taken as a preferred example of the same and that various changes relative to the shape, material, size and arrangement of parts may be resorted to without departing from the spirit of the invention or the scope of the subjoined claim.

Having thus described my invention, I claim:—

In combination with the wheel rim and casing of an automobile tire, an inner tube having an annulus carried therein, a valve stem being counter-sunk in the internal annulus, and means retaining said valve stem in a fixed position within said annulus, said means comprising a substantially rectangular plate having pointed extremities embedded in the internal annulus, fastening elements securing said plate to the wheel rim and a lock nut surrounding said valve stem and co-operating with said plate.

In testimony whereof I affix my signature.

FREDERICK W. KRONE.